(No Model.) 2 Sheets—Sheet 1.
H. A. BACON.
SEED PLANTER.
No. 545,867. Patented Sept. 10, 1895.
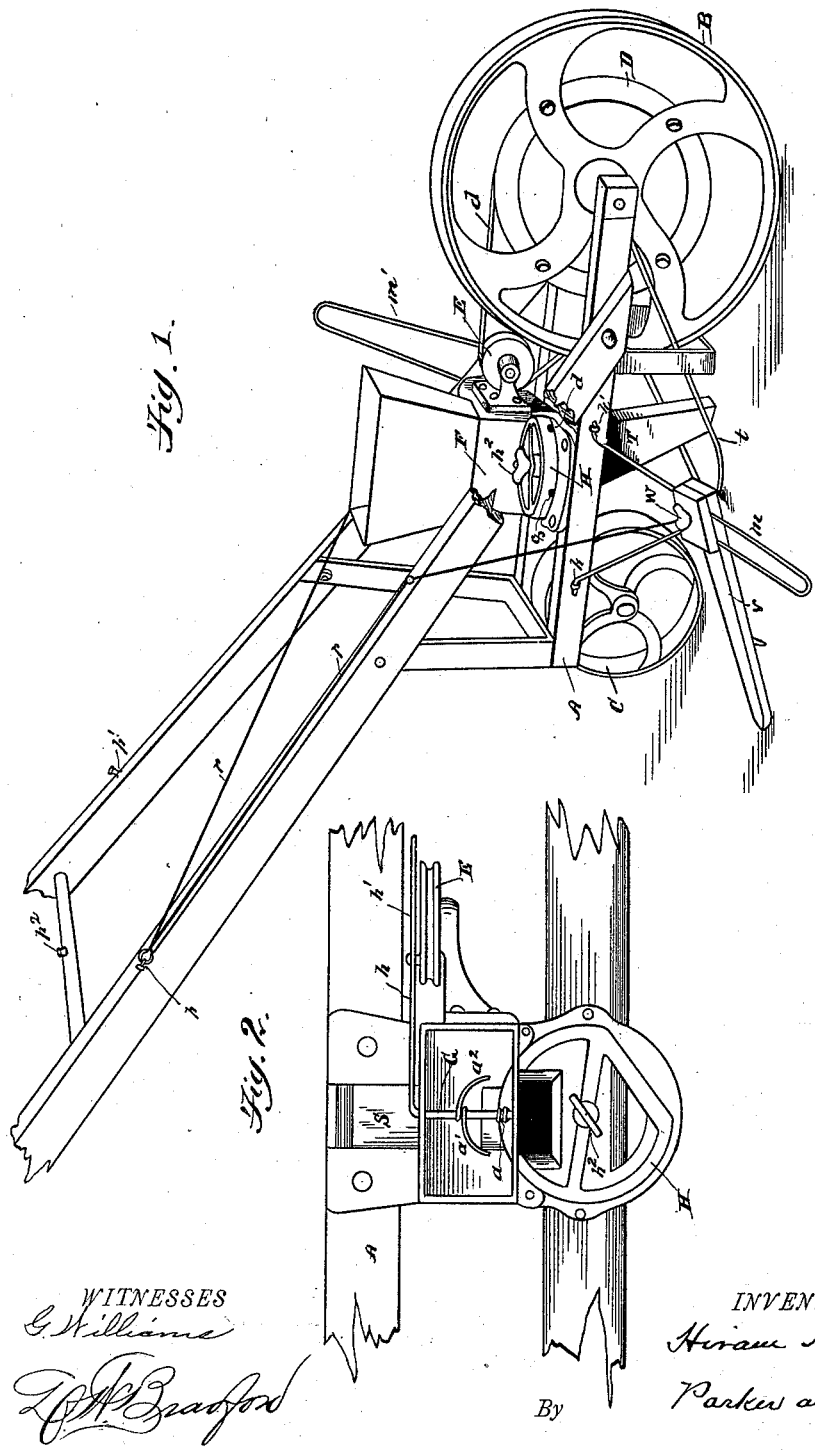
WITNESSES
G. Williams
D. H. Bradford
INVENTOR
Hiram A. Bacon
By Parker and Burton
Attorneys.

(No Model.) 2 Sheets—Sheet 2.
H. A. BACON.
SEED PLANTER.
No. 545,867. Patented Sept. 10, 1895.
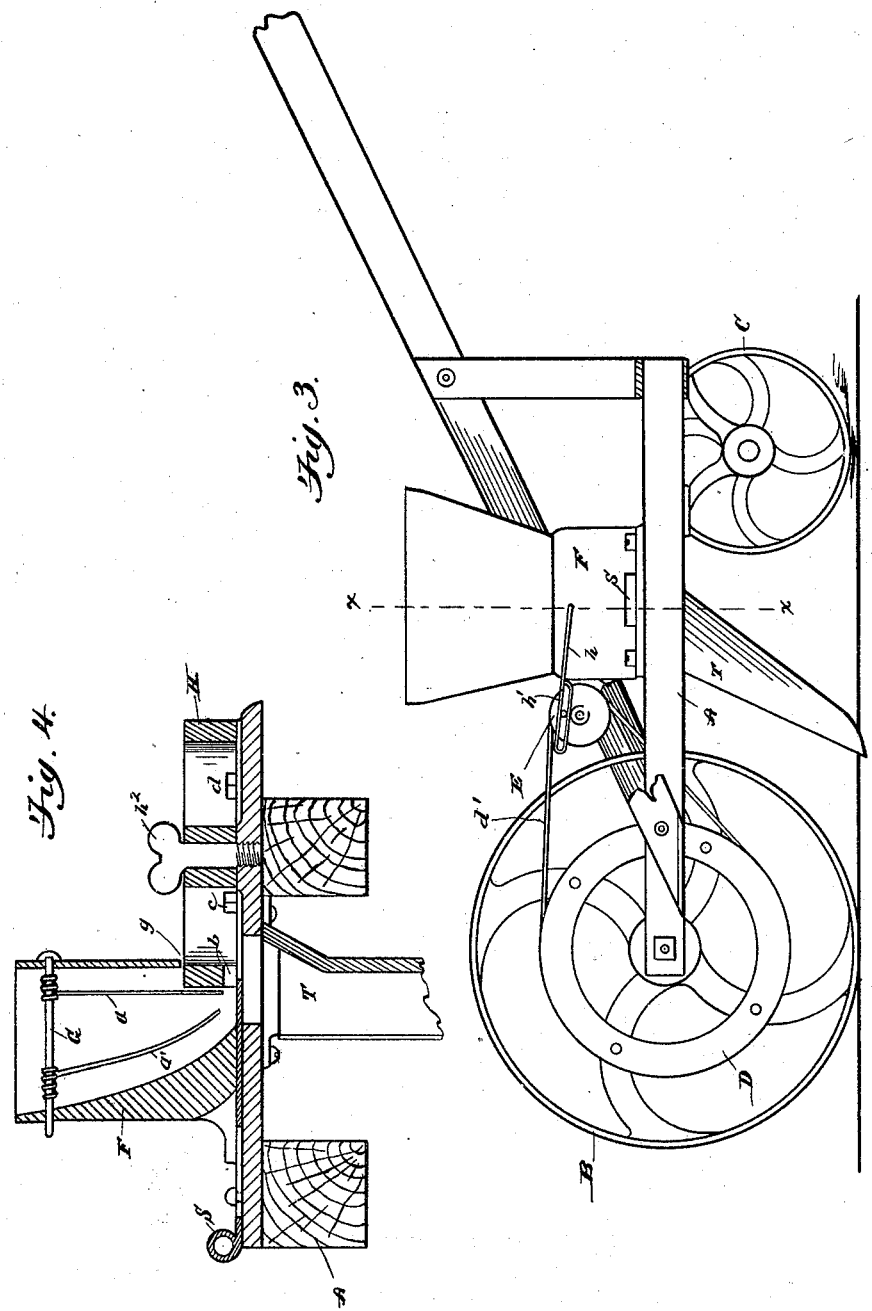
WITNESSES
G. Williams
D. H. Bradford
INVENTOR
Hiram A. Bacon
By Parker and Burton
Attorneys.

UNITED STATES PATENT OFFICE.

HIRAM A. BACON, OF PONTIAC, MICHIGAN.

SEED-PLANTER.

SPECIFICATION forming part of Letters Patent No. 545,867, dated September 10, 1895.

Application filed November 16, 1894. Serial No. 529,017. (No model.)

*To all whom it may concern:*

Be it known that I, HIRAM A. BACON, a citizen of the United States, residing at Pontiac, county of Oakland, State of Michigan, have invented a certain new and useful Improvement in Hand-Seeders; and I declare the following to be a full, clear, and exact description of the invention, such as will enable others skilled in the art to which it pertains to make and use the same, reference being had to the accompanying drawings, which form a part of this specification.

This invention relates to hand seeding-machines, and has for its object improvements which relate to the delivery or feed of the seeds from the hopper in which they are carried to the chute, through which they are delivered to the ground.

It has also for its object an improvement in the means employed to mark the adjacent row while delivering seed into a row that has been previously marked.

Other improvements will be pointed out in the specification.

In the drawings, Figure 1 shows the working parts of the seeder in perspective, a part of the handle near its lower end, however, being broken away in order that parts behind the handle may be seen. Fig. 2 is a plan of the hopper and feed-wheel. Fig. 3 is a side elevation, as seen from the left side. Fig. 4 is a cross-section through the hopper and feed-wheel, taken at the line $x\ x$ of Fig. 3.

A indicates the framework, which is supported at its forward end on the wheel B and at its rear end on a broad wheel C, that serves as a support and at the same time as a roller to press down the soil over seeds that have been planted. On the axle of the wheel B is fixed belt-wheel or pulley-wheel D, from which a belt $d'$ passes to a small crank-wheel E, that is located forward of and a little at one side of the hopper-box F. Across the hopper-box and transverse the seeder passes a rocking shaft G, upon which are three vibrating arms. One of them $a$ is located close to the exit or feed-opening $b$ in the hopper F and the other two are close behind the first, the terminations of the three vibrating arms being located at the angles of a triangle.

At one side of the hopper F, near the bottom, is a rectangular opening into which projects from without a segment of a rotary wheel-shaped block H, in the periphery or felly part of which are a number of openings, one of which is seen at $b$, and another of which is seen at $c$, and a third of which is seen at $d$, and a fourth at $f$, in Figs. 1 and 4. These openings are of various sizes and are graduated with reference to the seeds which are to travel through them. Only one of the openings are used at a time in connection with the hopper F, and that one of the openings is selected for use which is appropriate to the size or quality of the seeds to be planted, and that part of the rotary block H in which the selected opening is located is turned to project through the opening $g$ in the bottom of the hopper F, and thus the two parts—the hopper-box F proper and the inward-projecting part of the rotary block H—comprise a hopper with an outlet-opening that is adjustable for any size of seeds that it may be desired to sow. There is a still further adjustment of the opening, produced by means of a slide S, which lies across the bottom of the hopper F and projects underneath the opening $b$ in the rotary block H. By moving the slide S in or out the horizontal length of the opening $b$ is increased or diminished, and this has the effect of regulating the amount of seed delivered from the hopper into the chute T. As the planter progresses, the motion of the wheel B is communicated to the crank-wheel E, and from the crank-wheel a rocking motion is communicated to the rock-shaft G, which is connected with the crank upon the crank-wheel E by a long arm $h$, at one end of which is a loop or eye $h'$, that engages with the crank-pin upon the crank-wheel E.

The rocking motion of the shaft G produces a vibratory motion of the three fingers $a$, $a'$, $a^2$, and the vibratory motion of these fingers keeps the seeds immediately in front of the exit-opening $b$ in movement and aid the weight of the seeds in the hopper in forcing the seed forward properly. The two fingers $a'\ a^2$ are located behind or farther from the opening $b$ than the finger $a$. They supplement the primary fingers $a$ and aid in forcing the seed forward in the proper way and with the proper speed, while the exit is regulated by the sliding valve S and by the chosen opening $b$. The seed dropping through the chute T are deposited on the ground immediately behind the driving-wheel and in front of a covering-drag $t$, which consists of a looped rod swinging freely from the frame and dragging behind the spout or chute T, with its loop crossing the trench that has been made by the lower end of the spout. Behind the drag $t$ follows the broad wheel C, which acts as a roll to press down slightly the earth over the seeds which have been deposited and covered.

The rotary block H is mounted on a central spindle that rises vertically from the frame and is held in the selected position by a set-screw $h^2$.

To each side of the frame of the seeder I hinge a light arm, preferably a light iron rod or stiff wire, which is bent into a loop, and which from the loop inward for a short distance extends with two parallel sides and then spreads to the place of connection with the side bars of the frame. These loops are shown at $m$ $m'$, and the outer parallel portion carries a sliding finger $v$, capable of adjustment along the parallel portion and capable of being secured in the adjusted position by set-screw $w$, which pinches the two parts of the finger together. There are two of these marking finger-frames, one at each side of seeder, and from each extends a draft connection by which it may be lifted and held up away from the ground, or which may be adjusted to allow it to reach the ground and produce a mark. Usually only one of these markers will be used at a time, that one which lies to the land side or unplanted side being dropped down to position to mark the furrow of the next row of seeds to be planted; and as the operator works back and forth across the field, he will alternately use one and then the other of these fingers and I prefer to make the draft arrangement by which the one is lifted and the other dropped in the form of a flexible cord, the ends of which are secured to the fingers, one end being secured to each finger, and the body or loop of which extends back to that part of the handles near which the operator or driver stands, and I place on each handle a holding-pin $p$ $p'$ and a third holding-pin midway on the cross-bar between the handles, and by engaging the loop or bight of the flexible cord $r$ with the pin $p$ the marker on the opposite side is lifted and the marker on the same side with the pin is dropped into position to produce a mark over the ground. By shifting the loop and engaging it with the pin $p'$ the position of the markers is reversed. By again shifting and engaging the bight of the cord with the centrally-located pin $p^2$ both markers are lifted out of engagement. This, while very simple, is extremely efficient and convenient. At the same time the fingers $v$ may be adjusted inward or outward along the parallel parts of the looped rod $m$ to any desired width between the rows to be planted. The looped rod $m$ turns from one to the other of the positions mentioned above in the hinge-eyes $k k'$.

This seeder can readily be employed for the purpose of sowing phosphates or similar dry or granular fertilizers, and when employed for this purpose the agitator having several fingers is especially useful.

What I claim is—

1. In a seeder, the combination of a rotary block provided with a vertically disposed rim, and openings of various sizes through said rim, a hopper into which a segment of the rim projects, a plurality of vibrating stirring fingers arranged to vibrate in front of the opening through said rim, and means for producing such vibratory motion, substantially as described.

2. In a seeder, the combination of a hopper, a rotary block projecting thereinto provided with a vertically disposed rim, holes through said rim of various sizes for the exit of seed, vibratory fingers adapted to vibrate in front of said opening, and a sliding valve arranged to graduate the size of the opening through which the seed passes, substantially as described.

3. In a seeder, in combination a rotary block provided with a vertically disposed rim, and openings of various sizes through said rim, a hopper into which a segment of the rim projects, means for forcing the seed from said hopper through the spout, and a looped drag adapted to cover the seed dropping from said spout, substantially as described.

4. In a seeder, in combination a rotary block provided with a vertically disposed rim, and openings of various sizes through said rim, a hopper through which a segment of said rim projects, a plurality of vibrating stirring fingers arranged to vibrate in front of the opening through said block, a pair of marking guides, one located on each side of the seeder frame, a flexible shifting cord, the ends of which are secured to the markers and the bight of which passes back to and engages with a series of pins located on the frame of the seeder, substantially as described.

In testimony whereof I sign this specification in the presence of two witnesses.

HIRAM A. BACON.

Witnesses:
CLARENCE D. CLARK,
S. W. SMITH.